(12) United States Patent
Fickeisen et al.

(10) Patent No.: US 6,409,860 B1
(45) Date of Patent: Jun. 25, 2002

(54) METHOD FOR ADHERING A FLOOR COVERING TO A FLOOR WITH A FLOOR ADHESIVE

(75) Inventors: Peter Fickeisen, Dirmstein; Oral Aydin, Mannheim; Eckehardt Wistuba, Bad Dürkheim; Thomas Schwerzel, Meckenheim; Rüdiger Füssl, Neustadt; Dieter Urban, Speyer, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 08/687,427
(22) PCT Filed: Feb. 1, 1995
(86) PCT No.: PCT/EP95/00350
§ 371 (c)(1),
(2), (4) Date: Aug. 9, 1996
(87) PCT Pub. No.: WO95/21884
PCT Pub. Date: Aug. 17, 1995

(30) Foreign Application Priority Data

Feb. 11, 1994 (DE) .......................................... 44 04 411

(51) Int. Cl.$^7$ ................................................. E04B 2/00
(52) U.S. Cl. ........................ 156/71; 52/746.1; 524/543; 524/560; 524/801
(58) Field of Search ........................... 156/71; 524/801, 524/543, 560; 52/746.1

(56) References Cited

U.S. PATENT DOCUMENTS 2,976,204 A * 3/1961 Young et al. .................. 156/71
3,736,283 A * 5/1973 Taylor ......................... 524/560

FOREIGN PATENT DOCUMENTS

JP 50-13428 * 2/1975 ................. 524/560

* cited by examiner

Primary Examiner—John J. Gallagher
(74) Attorney, Agent, or Firm—Oblon, Spivak, McClelland, Maier & Neustadt, P.C.

(57) ABSTRACT

An aqueous composition is essentially free of organic solvents, plasticizers and additional tackifiers and contains water and 20–99% by weight of a polymer and 1–80% by weight of a filler, the percentages by weight being based on the sum of the components of the aqueous composition, with the exception of water.

8 Claims, No Drawings

METHOD FOR ADHERING A FLOOR COVERING TO A FLOOR WITH A FLOOR ADHESIVE

DISCUSSION OF THE BACKGROUND

1. Field of the Invention

The present invention relates to the use of an aqueous composition, free of organic solvents, plasticizers and additional tackifiers, containing water and 20–99% by weight of a polymer having a glass transition temperature below −25° C. and 1–80% by weight of a filler, the percentages by weight being based on the sum of the components of the aqueous composition, with the exception of water, as a floor adhesive.

2. Discussion of the Background

EP-A-490 191 discloses solvent-free floor adhesives based on an acrylate dispersion. The floor adhesives described there inevitably contain a tackifier and a plasticizer.

DE-A-41 41 168 relates to contact adhesive dispersions of vinyl ester/acrylate copolymers. The copolymers have a glass transition temperature of from −20 to +20° C.

In principle, it is desirable for adhesives to have very few components, in order to facilitate their preparation and reduce costs. In particular, adhesives should be free of components which escape from the adhesive bond during subsequent use and can lead to undesirable emissions.)

In the case of the performance characteristics, good tack (for example good wet and dry grab), and good heat distortion resistance of the adhesive bond are particularly desirable.

SUMMARY OF THE INVENTION

It is an object of the present invention to provide adhesives, in particular floor adhesives, having the abovementioned properties.

The aqueous compositions contain preferably from 30 to 70, particularly preferably from 40 to 60, % by weight of a polymer having a glass transition temperature below −25°0 C. and from 30 to 70, particularly preferably from 40 to 60, % by weight of a filler.

The percentages by weight are based on the sum of the components of the aqueous composition, with the exception of water, ie. essentially on the solids content of the composition.

The polymer is preferably a polymer obtained by free radical polymerization of ethylenically unsaturated monomers.

The polymer may be composed of, for example, $C_1$–$C_{20}$-alkyl (meth)acrylates, vinyl esters of carboxylic acids of up to 20 carbon atoms, vinylaromatics of up to 20 carbon atoms, ethylenically unsaturated nitriles, vinyl halides, nonaromatic hydrocarbons having at least 2 conjugated double bonds or mixtures of these monomers.

The abovementioned monomers may be present in the polymer, for example, in amounts of from 60 to 100, preferably from 80 to 100, particularly preferably from 90 to 99.8, % by weight, based on polymer.

Examples are alkyl (meth)acrylates having a $C_1$–$C_{10}$-alkyl radical, such as methyl methacrylate, methyl acrylate, n-butyl acrylate, ethyl acrylate and 2-ethylhexyl acrylate.

Mixtures of alkyl (meth)acrylates are also particularly suitable.

Vinyl esters of carboxylic acids of 1 to 20 carbon atoms are, for example, vinyl laurate, vinyl stearate, vinyl propionate, vinyl versatate and vinyl acetate.

Suitable vinylaromatic compounds are vinyltoluene, α- and p-methylstyrene, α-butylstyrene, 4-n-butylstyrene, 4-n-decylstyrene and preferably styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of nonaromatic hydrocarbons having 2 to 8 carbon atoms and at least two olefinic double bonds are butadiene, isoprene and chloroprene.

(Meth)acrylates and mixtures thereof are particularly preferred.

Further monomers, which may be present in the polymer in amounts of, for example, from 0 to 40, preferably from 0 to 20, particularly preferably from 0.2 to 10, % by weight, are in particular $C_1$–$C_{10}$-hydroxyalkyl (meth)acrylates, (meth)acrylamide and the derivatives thereof substituted on the nitrogen by $C_1$–$C_4$-alkyl, ethylenically unsaturated carboxylic acids, dicarboxylic acids, half-esters and anhydrides thereof, for example (meth)acrylic acid, maleic acid, fumaric acid, maleic anhydride, maleic and fumaric half-esters and itaconic acid. A content of from 0.2 to 5% by weight of an ethylenically unsaturated carboxylic acid is very particularly preferred.

The glass transition temperature of the polymer is below −25° C., in particular from −25 to −60° C., particularly preferably from −30 to −50° C.

The glass transition temperature of the polymer can be determined by conventional methods, such as differential thermal analysis or differential scanning calorimetry (cf. for example ASTM 3418/82, ie. midpoint temperature).

The number average molecular weight $M_n$ of the polymer is preferably greater than 10,000, in particular greater than 20,000, particularly preferably greater than 30,000, and the weight average molecular weight $M_w$ is preferably greater than 250,000 (determined by gel permeation chromatography using polystyrene as standard in a polymer solution in tetrahydrofuran after sedimentation of the insoluble components); the proportion of the insoluble components in the polymer is preferably from 0–90, particularly preferably 20–70, very particularly preferably from 40 to 60, % by weight, based on the polymer.

The polymer is prepared by free radical polymerization. Suitable polymerization methods, such as mass, solution, suspension or emulsion polymerization, are known to a person skilled in the art.

The copolymer is preferably prepared by solution polymerization with subsequent dispersing in water or particularly preferably by emulsion polymerization, so that aqueous copolymer dispersions are formed.

The emulsion polymerization can be carried out batchwise, with or without the use of seed latices, initially taking all or individual components of the reaction mixture, or preferably initially taking part of the components and subsequently metering in the components or individual components of the reaction mixture, or by the metering method without initially taking any components.

In the emulsion polymerization, the monomers can be polymerized in a conventional manner in the presence of a water-soluble initiator and of an emulsifier at, preferably, from 30 to 95° C.

Examples of suitable initiators are sodium persulfate, potassium persulfate, ammonium persulfate, tert-butyl hydroperoxides, water-soluble azo compounds or redox initiators, such as $H_2O_2$/ascorbic acid.

The emulsifiers used are, for example, alkali metal salts of relatively long-chain fatty acids, alkylsulfates, alkylsulfonates, alkylated arylsulfonates or alkylated diphenyl ether sulfonates. Other suitable emulsifiers are reaction products of alkylene oxides, in particular ethylene oxide or propylene oxide, with fatty alcohols, fatty acids or phenol, or alkylphenols.

In the case of aqueous secondary dispersions, the copolymer is first prepared by solution polymerization in an organic solvent and then dispersed in water with the addition of salt formers, for example of ammonia to carboxyl-containing copolymers, without the use of an emulsifier or dispersant. The organic solvent can be distilled off. The preparation of aqueous secondary dispersions is known to a person skilled in the art and is described in, for example, DE-A-37 20 860.

Regulators may be used in the polymerization in order to regulate the molecular weight. For example, —SH-containing compounds, such as mercaptoethanol, mercaptopropanol, thiophenol, thioglycerol, ethyl thioglycolate, methyl thioglycolate and tert-dodecyl mercaptan, are suitable.

The solids content of the polymer dispersions obtained is preferably from 40 to 80, particularly preferably from 45 to 75, % by weight. High polymer solids contents can be obtained, for example, by processes which are described in German Patent Application P 4 307 683.1 or European Patent 37 923.

The aqueous composition also contains at least one filler in addition to the polymers. Suitable fillers are, for example, finely milled or precipitated chalks having a mean particle diameter of, in general, from 2 to 50 µm and/or quartz powder having a conventional mean particle diameter of from 3 to 50 µm.

The composition may furthermore contain wetting agents or dispersants, for example for the fillers thickeners and, for example, further conventional additives, such as antifoams and preservatives.

The aqueous composition may contain, for example, from 0 to 5% by weight of wetting agents or dispersants, from 0 to 10% by weight of thickeners, from 0 to 1% by weight of preservatives and from 0 to 5% by weight of antifoams. The stated weights are based on the sum of all components of the aqueous composition, with the exception of water.

The composition is free of organic solvents and plasticizers, such as butyl acetate, toluene or phthalates. It therefore contains essentially no organic compounds having a boiling point below 260° C. at atmospheric pressure (1 bar).

The composition is also free of tackifiers, such as rosins, which are usually additionally employed.

The aqueous composition can be prepared in a simple manner by adding the fillers and, if required, further additives to the aqueous polymer dispersion obtained in the emulsion polymerization, while stirring.

The water content of the prepared composition is in general from 7 to 50, in particular from 10 to 30, % by weight, based on the total aqueous composition.

The aqueous composition is suitable as floor adhesive for floor coverings, for example comprising PVC, in the form of multilayer coverings or homogeneous coverings, foam coverings having a textile backing, for example jute, polyester nonwoven, rubber coverings, textile coverings having different backings, such as polyurethane foam, styrene/butadiene foam, textile secondary backings, needle felt floor coverings, polyolefin coverings or linoleum coverings, on surfaces such as wood, stone, concrete, ceramic tiles, metal surfaces or the like.

The adhesive can be applied to the substrate, for example, by means of a toothed strip. After drying in the air in the usual manner, the floor covering is laid. In terms of the procedure, the novel adhesive is equivalent to the solvent-containing synthetic resin adhesives and the traditional one-sided dispersion adhesives. With regard to the processability, the new adhesive is similar to solvent-containing adhesives. The novel adhesive composition has a good level of performance characteristics, such as peel strength, shear strength, wet grab and dry grab and high heat distortion resistance.

In the examples which follow, parts and percentages are by weight, unless stated otherwise.

EXAMPLES

Example 1

In a reaction vessel having a stirrer and feed vessels, 240 parts of water, 1 part of ascorbic acid and 1.5 parts of a seed emulsion (prepared according to Example 5) are heated to 85° C. After the addition of 2.0 parts of sodium persulfate, an emulsion comprising 219 parts of water, 16 parts of the sodium salt of sulfated reaction product of lauryl alcohol with 2.5 mol of ethylene oxide, 1 part of ascorbic acid, 4 parts of sodium hydroxide, 2 parts of tert-dodecyl mercaptan, 1660 parts of butyl acrylate, 280 parts of ethylhexyl acrylate, 50 parts of methacrylic acid and 10 parts of hydroxyethyl acrylate is fed in uniformly over 3 hours. At the same time, a solution of 8 g of sodium persulfate in 200 g of water is added in a separate feed. The content of the reaction vessel is then kept at 85° C. for a further hour.

Aftertreatment: The mixture is cooled to 60° C., and two solutions consisting of 2 parts of tert-butyl hydroperoxide in 18 parts of water and of 2 parts of sodium disulfite, 0.1 part of iron(II) sulfate .7H$_2$O, 1.4 parts of acetone and 30 parts of water are added simultaneously in the course of 1 hour.

The content of the reaction vessel is then kept at 60° C. for a further ½ hour. The pH is brought to 7.0–7.5 by adding 10% strength NaOH.

Volatile compounds are removed under reduced pressure (200 mbar) as long as the sum of the volatile organic components is less than or at most equal to 500 ppm, evaporated water being replaced with further water.

The glass transition temperature of the polymer is –43° C.

Example 2

In a reaction vessel having a stirrer and feed vessels, 225 parts of water are heated to 85° C. 12 parts of the emulsion feed and 30 parts of the initiator feed are added. 15 minutes later, uniform addition of the emulsion and of the initiator solution begins, the emulsion being added in the course of 2 ¼ hours and the initiator solution in the course of 3 hours.

The content of the reaction vessel is then kept at 85° C. for a further hour.

Emulsion feed

| | |
|---|---|
| 302 | parts of water |
| 5.8 | parts of Dowfax ® 2A1 (sodium salt of branched C$_{12}$ |

-continued

| | |
|---|---|
| | -alkyl-phenoxyphenyldisulfonate) |
| 1.2 | parts of sodium laurylsulfate |
| 1.3 | parts of tert-dodecyl mercaptan |
| 9 | parts of acrylic acid |
| 221 | parts of VEOVA ® 10 (vinyl ester of a synthetic fatty acid having a chain length of $C_{10}$, Neodecanoic acid) |
| 478 | parts of butyl acrylate |
| 177 | parts of ethylhexyl acrylate |
| 17.7 | parts of ureidomethacrylate |
| 70.8 | parts of methyl methacrylate |
| Initiator solution: | |
| 150 | parts of water |
| 2.5 | parts of sodium peroxodisulfate |

The aftertreatment is carried out as in Example 1.
The glass transition temperature of the polymer is −26° C.

Example 3

In a reaction vessel having a stirrer and feed vessels, 240 parts of water, 1 part of ascorbic acid and 1.5 parts of a seed emulsion (prepared according to Example 5) are heated to 85° C. 20% of the initiator solution are then added, after which the emulsion and the initiator solution are introduced, 6% of the emulsion being added in the course of 20 minutes and the remainder of the emulsion in the course of 3 hours. The remainder of the initiator solution is added uniformly in the course of 3.3 hours.

The content of the reaction vessel is then kept at 85° C. for a further hour.

| | |
|---|---|
| Emulsion feed: | |
| 219 | parts of water |
| 16 | parts of the sodium salt of a sulfated reaction product of lauryl alcohol with 2.5 mol of ethylene oxide |
| 1 | part of ascorbic acid |
| 4 | parts of sodium hydroxide |
| 2 | parts of ethylhexyl thioglycolate |
| 1660 | parts of butyl acrylate |
| 280 | parts of ethylhexyl acrylate |
| 60 | parts of methacrylic acid |
| Initiator feed: | |
| 250 | parts of water |
| 10 | parts of sodium peroxodisulfate |

The aftertreatment is as in Example 1.
The glass transition temperature of the polymer is −43° C.

Example 4

The procedure corresponds to Example 2, but 13 parts of the emulsifier feed and 25 parts of the initiator solution are added.

| | |
|---|---|
| Emulsion feed: | |
| 260 | parts of water |
| 7 | parts of the sodium salt of a sulfated reaction product of lauryl alcohol with 2.5 mol of ethylene oxide |
| 1.5 | parts of sodium laurylsulfate |
| 1 | part of mercaptopropyltrimethoxysilane |

-continued

| | |
|---|---|
| Emulsion feed: | |
| 1.5 | parts of tert-dodecyl mercaptan |
| 10 | parts of acrylic acid |
| 133 | parts of methyl methacrylate |
| 307 | parts of ethylhexyl acrylate |
| 552 | parts of butyl acrylate |

The glass transition temperature of the polymer is −32° C.

Example 5

Preparation of aqueous initial polymer emulsion, starting from the emulsion from Example 6 as seed emulsion for Examples 1 and 3

| | |
|---|---|
| $ADI_1$: A mixture of | |
| 35 kg | of water, |
| 0.025 kg | of ascorbic acid, |
| 1.00 kg | of emulsion from Example 6 and |
| 1.55 kg | of feed I | is heated to 85° C., after which 0.825 kg of feed II is added all at once. The incipient polymerization is left to itself while maintaining the temperature of 85° C. for 10 minutes. Thereafter, the remaining amount of feed I (in the course of 3 hours) and remaining amount of feed II (in the course of 4 hours) are added continuously to the polymerization mixture, beginning at the same time, while maintaining the temperature of 85° C. The stirring is then continued for a further hour.

| | |
|---|---|
| Feed I: | |
| 49 kg | of n-butyl acrylate |
| 1 kg | of nethacrylic acid |
| 1.79 kg | of a 28 % strength by weight aqueous solution of the sodium salt of the sulfuric half-ester of ethoxylated $C_{12}$-fatty alcohol (degree of ethoxylation 25) = emulsifier solution 1 |
| 0.4 kg | of a 25 % strength by weight aqueous sodium hydroxide solution and |
| 25.2 kg | of water |
| Feed II: | |
| 8 kg | of water |
| 0.25 kg | of sodium peroxodisulfate. |

An aqueous initial polymer emulsion $ADI_1$ is obtained, which is characterized as follows:

| | |
|---|---|
| Solids content: | 40.5% by weight |
| $d_{w,n}$: | 219 nm |

Example 6

Preparation of an aqueous initial polymer emulsion 25% by weight of feed II are added all at once, at 25° C., to a mixture of

| | |
|---|---|
| 1.44 kg | of n-butyl acrylate |
| 16.28 kg | of water |
| 1.27 kg | of a 45% strength by weight surfactant corresponding to Dowfax 2A1 and |
| 0.52 kg | of a 30% strength by weight aqueous, hydrogen peroxide solution. |

After the mixture has warmed up to 50° C. as a result of the incipient exothermic polymerization (after about 10 minutes), the remaining amount of feed II (in the course of 3 hours) and the remaining amount of feed I (in the course of 2 hours) are added continuously, beginning at the same time, while maintaining the temperature of 50° C. Stirring was then carried out for a further 1 hour at 60° C.

Feed I:

| | |
|---|---|
| 47.0 kg | of water |
| 14.7 kg | of n-butyl acrylate |
| 14.7 kg | of methyl methacrylate |
| 0.60 kg | of methacrylic acid |
| 0.664 kg | of a 45% strength by weight aqueous solution of the surfactant corresponding to Dowfax 2A1 |

Feed II:

| | |
|---|---|
| 10 kg | of water |
| 0.156 kg | of ascorbic acid |
| 0.004 kg | of iron(II) sulfate. |

An aqueous initial polymer emulsion is obtained, which is characterized as follows:

Solids content: 30 % by weight $\bar{d}_w$: 40 nm $\left(\dfrac{d_{90} - d_{10}}{d_{50}}\right)$: 0.549

Use Examples 1A to 4A and Comparative Example

Example 1A 500 parts by weight of chalk (®Ulmer white×M) are incorporated in 696 parts by weight of the 71.8% strength polymer emulsion of Example 1 by adding the chalk a little at a time to the initially taken emulsion while stirring. After the adhesive has matured for 24 hours, the wet grab and dry grab are determined (cf. test method). The results are listed in Table 1.

Example 2A 500 parts by weight of chalk are incorporated in 923 parts by weight of the 54.2% strength polymer emulsion from Example 2. The test results are listed in Table 1.

Example 3A 500 g of chalk are stirred into 700 parts by weight of the 71.4% strength polymer emulsion from Example 3. The test results are shown in Table 1.

Example 4A 500 g of chalk are incorporated in 792 parts by weight of 63.1% strength polymer emulsion from Example 4 after the emulsion is brought to pH 8 with 10% strength sodium hydroxide solution. The test results are shown in Table 1.

TABLE 1

Wet and dry grab of the floor adhesives

| | 1A | 2A | 3A | 4A |
|---|---|---|---|---|
| Wet grab [N/5 cm] | | | | |
| after 10 min | 118 | 4 | 10 | 4 |
| 20 min | 45 | 16 | 32 | 23 |
| 30 min | 55 | 42 | 50 | 40 |
| Dry grab [N/5 cm] | | | | |
| after 10 min | 5 | 1 | 4 | 2 |
| 20 min | 35 | 3 | 45 | 27 |
| 30 min | 4 | 33 | 60 | 37 |
| 45 min | 4 | 28 | 48 | 25 |

Comparative Example

For comparison, a conventional floor covering adhesive having the following composition is also tested:

35.0 parts of Acronal® V 302; pH 7.5, a polymer based on acrylates and having a Tg of −20° C.

0.5 part of Emulphor® OPS 25, an emulsifier 0.2 part of Lumiten® EL, an antifoam 8.5 parts of Latekoll® D 2% strength, a thickener 2.0 parts of Plastilit® 3431, a plasticizer (monophenyl glycol ether)

20.0 parts of resin melt (80 parts of rosin and 20 parts of Plastilit 3431)

33.8 parts of calcite (calcium carbonate)

| Results: |  |
|---|---|
| Wet grab [N/5 cm] | |
| after 10 min | 3 |
| 20 min | 12 |
| 30 min | 28 |
| Dry grab [N/5 cm] | |
| after 10 min | 18 |
| 30 min | 30 |
| 45 min | 34 |

Description of the Test Methods

Wet Grab

The adhesive is applied with a DIN knife coater to a cement fiber board (eg. Eternit® 2000) (20×50 cm) in the peeling direction. The amount applied is about 350–400 g/m². After drying for 10 minutes in the air, needlefelt coverings (NBB strips) are laid in the adhesive bed and pressed down with a 2.5 kg roller by rolling forward and backward 3 times. The coverings are peeled off with a peeling apparatus at the stated time intervals, and the increase in the peeling resistance in N 5 cm is determined.

Dry Grab

The adhesive is applied with a DIN knife coater to a cement fiber board (eg. Eternit® 2000) (20×50 cm) in the peeling direction. The amount applied is about 250–300 g/m². After different periods of drying in the air, PVC strips (Pegulan® B 1) are laid in the adhesive bed and are pressed down with a 2.5 kg roller by rolling forward and backward 3 times. The strips are then peeled off with a peeling apparatus, and the peeling resistance in N 5 cm is determined.

We claim:

1. A method, comprising adhering a floor covering to a floor with a floor adhesive comprising an aqueous composition, free of organic solvents, plasticizers, and additional tackifiers, containing water and 20–99% by weight of a polymer having a glass transition temperature below −25° C., the polymer being composed (1) of from 60 to 100% by weight of $C_1$–$C_{20}$-alkyl (meth)acrylates, vinyl esters of carboxylic acids of up to 20 carbon atoms, vinyl aromatics of up to 20 carbon atoms, ethylenically unsaturated nitriles, vinyl halides, non-aromatic hydrocarbons having at least two conjugated double bonds or mixtures of these monomers, and 1–80% by weight of a filler, the percentages by weight being based on the sum of the components of the aqueous composition, with the exception of water, the floor adhesive being applied to one side of the floor covering.

2. The method of claim 1, wherein the polymer is in the form of a 45–75% strength by weight aqueous emulsion.

3. The method of claim 1, wherein the glass transition temperature of the polymer is below −30° C.

4. The method of claim 1, wherein the polymer consists of from 60 to 100% by weight of $C_1$–$C_{20}$-alkyl (meth) acrylates.

5. The method of claim 1, wherein the number average molecular weight $M_n$ of the polymer is greater than 20,000.

6. The method of claim 1, wherein the filler content is from 40 to 80% by weight.

7. The method of claim 1, wherein the polymer is additionally composed of (2) from 40 to 0% by weight of $C_1$–$C_{10}$-hydroxyalkyl(meth)acrylates, (meth)acrylamide, (meth)acrylamide substituted on the nitrogen thereof by $C_1$–$C_4$-alkyl, ethylenically unsaturated carboxylic acids, dicarboxylic acids, half-esters and anhydrides thereof, the sum of (1) and (2) being 100%.

8. The method of claim 1, wherein the polymer does not contain ethylene monomers.

* * * * *